(12) United States Patent
Stamatovski

(10) Patent No.: US 11,220,352 B2
(45) Date of Patent: *Jan. 11, 2022

(54) UNMANNED AERIAL VEHICLE LANDING STATION WITH CENTERING MECHANISM

(71) Applicant: Easy Aerial Inc., Brooklyn, NY (US)

(72) Inventor: Ivan Stamatovski, Long Island City, NY (US)

(73) Assignee: Easy Aerial Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,823

(22) Filed: Jun. 3, 2021

(65) Prior Publication Data

US 2021/0292005 A1 Sep. 23, 2021

Related U.S. Application Data

(63) Continuation of application No. 17/141,174, filed on Jan. 4, 2021, now Pat. No. 11,046,459, which is a continuation of application No. 15/824,767, filed on Nov. 28, 2017, now Pat. No. 10,934,019.

(60) Provisional application No. 62/427,512, filed on Nov. 29, 2016.

(51) Int. Cl.
| | | |
|---|---|---|
| B64C 1/24 | (2006.01) | |
| B64F 1/24 | (2006.01) | |
| B64C 39/02 | (2006.01) | |
| B64F 1/00 | (2006.01) | |
| B64F 1/22 | (2006.01) | |
| B64F 1/18 | (2006.01) | |

(52) U.S. Cl.
CPC .............. *B64F 1/24* (2013.01); *B64C 39/024* (2013.01); *B64F 1/007* (2013.01); *B64F 1/18* (2013.01); *B64F 1/222* (2013.01); *B64C 2201/042* (2013.01); *B64C 2201/066* (2013.01); *B64C 2201/141* (2013.01); *B64C 2201/18* (2013.01); *B64C 2201/201* (2013.01)

(58) Field of Classification Search
CPC .. B64F 1/22; B64F 1/125; B64F 1/222; B64F 1/24
See application file for complete search history.

(56) References Cited

U.S. PATENT DOCUMENTS

| | | |
|---|---|---|
| 2,395,528 A | 2/1946 | Andersen |
| 3,035,528 A | 5/1962 | Bolton |
| 5,988,564 A | 11/1999 | Lee |

(Continued)

FOREIGN PATENT DOCUMENTS

| | | | |
|---|---|---|---|
| CN | 106712160 A | 5/2017 | |
| CN | 207748039 U | * 8/2018 | ................ B64F 1/00 |
| WO | 2017065411 A1 | 4/2017 | |

*Primary Examiner* — Michael H Wang
(74) *Attorney, Agent, or Firm* — Carter, DeLuca & Farrell LLP; George Likourezos; Jason B. Scher

(57) ABSTRACT

A landing station for an unmanned aerial vehicle includes a landing surface and a centering wheel. The centering wheel is coupled to the landing surface and has a spoke extending therefrom. The spoke is positioned to rotate relative to the landing surface in response to rotation of the centering wheel relative to the landing surface. The spoke is configured to rotate into engagement with a landing leg of the unmanned aerial vehicle to impart centrifugal force onto the landing leg sufficient to rotate the unmanned aerial vehicle toward a predetermined position on the landing surface.

20 Claims, 11 Drawing Sheets

(56) References Cited

U.S. PATENT DOCUMENTS

| | | |
|---|---|---|
| 9,302,783 B2 | 4/2016 | Wang |
| 9,387,928 B1 | 7/2016 | Gentry |
| 9,880,563 B2 | 1/2018 | Fisher |
| 9,928,749 B2 | 3/2018 | Gil |
| 10,274,952 B2 | 4/2019 | Cantrell |
| 10,287,034 B2 | 5/2019 | Mozer |
| 10,457,421 B2 | 10/2019 | O'Toole |
| 10,577,099 B2 | 3/2020 | Akens |
| 11,046,459 B2 | 6/2021 | Stamatovski |
| 2014/0124621 A1* | 5/2014 | Godzdanker ............. B64F 1/28 244/110 E |
| 2015/0183528 A1 | 7/2015 | Walsh |
| 2016/0257424 A1 | 9/2016 | Stabler |
| 2016/0257426 A1 | 9/2016 | Mozer |
| 2017/0073084 A1 | 3/2017 | Mozer |
| 2017/0144776 A1 | 5/2017 | Fisher |
| 2017/0158353 A1* | 6/2017 | Schmick .............. G05D 1/0033 |
| 2017/0217323 A1* | 8/2017 | Antonini ................ B60L 53/18 |
| 2017/0240062 A1* | 8/2017 | Jaiswal ................ G05D 1/0011 |
| 2018/0141680 A1 | 5/2018 | Heinonen |
| 2018/0178665 A1* | 6/2018 | Chen ....................... B60L 53/16 |
| 2019/0002127 A1 | 1/2019 | Straus |
| 2019/0039751 A1 | 2/2019 | Janssen |
| 2019/0245365 A1 | 8/2019 | Farrahi Moghaddam |
| 2020/0165008 A1 | 5/2020 | Krauss |
| 2020/0207484 A1* | 7/2020 | Foggia ..................... B64F 1/22 |

* cited by examiner

UNMANNED AERIAL VEHICLE LANDING STATION WITH CENTERING MECHANISM

CROSS-REFERENCE TO RELATED APPLICATIONS

This application is a continuation of U.S. patent application Ser. No. 17/141,174, filed Jan. 4, 2021, which is a continuation of U.S. patent application Ser. No. 15/824,767, filed Nov. 28, 2017, now U.S. Pat. No. 10,934,019, which claims benefit of U.S. Provisional Patent Application No. 62/427,512, filed Nov. 29, 2016, the entire contents of each of which are hereby incorporated herein by reference.

TECHNICAL FIELD

The present disclosure relates to unmanned aerial vehicles and, more particularly, to charging stations for unmanned aerial vehicles.

BACKGROUND

An unmanned aerial vehicle (UAV) is an aerial vehicle that operates without carrying a live pilot. While once being used almost exclusively for military functions, UAVs have seen increasing use for civilian functions, such as monitoring, as well as for hobbyists. Many UAVs that are commercially sold may include imaging equipment, such as a camera, that can transmit captured images to an operator controlling the UAV remotely. UAVs are becoming particularly popular with aerial photography/videography professionals. Developments in the field have produced UAVs with varying degrees of autonomy, reducing the amount of operator input needed to perform certain tasks.

UAVs rely on a portable power source, such as one or more batteries, to power the components of the aerial vehicle during flight. One particular problem with using batteries to power the aerial vehicle is that, even if the batteries are rechargeable, the batteries must be recharged or replaced once depleted. Typically, recharging or replacing the batteries requires the aerial vehicle to land at a location where a user can either "plug in" the vehicle to recharge the batteries or remove and replace the batteries. Either scenario requires inconvenient user intervention to provide power to the vehicle, which can be especially inconvenient when the vehicle is operating in a remote area that is far from the user.

SUMMARY

The present disclosure provides landing stations, such as charging stations, for unmanned aerial vehicles that include a centering wheel for centering a landed unmanned aerial vehicle. Landing stations as taught herein facilitate charging of a UAV without human interaction.

In one exemplary embodiment disclosed herein, a charging station for an unmanned aerial vehicle includes a landing surface having a first charging terminal formed of a first electrically conductive material, a second charging terminal formed of a second electrically conductive material and spaced apart from the first charging terminal, and an electrically insulating material disposed between the first charging terminal and the second charging terminal. A centering wheel is rotatably associated with the landing surface and has a center huh and a plurality of spokes extending from the center hub. A rotator is coupled to the centering wheel and configured to rotate the centering wheel to align the unmanned aerial vehicle with the first charging terminal and the second charging terminal.

In another exemplary embodiment provided in accordance with the present invention, an unmanned aerial vehicle landing system includes a landing station having a landing surface, a centering wheel rotatably associated with the landing surface and having a center huh and a plurality of spokes extending from the center hub, and a rotator coupled to the centering wheel and configured to rotate the centering wheel.

In yet another exemplary embodiment, there is provided a method of centering an unmanned aerial vehicle on a landing surface having a centering wheel rotatably associated therewith. The centering wheel has a center hub and a plurality of spokes extending from the center hub. The method includes placing a plurality of legs of the unmanned aerial vehicle on the landing surface and rotating the centering wheel a full rotation so that each of the plurality of legs of the unmanned aerial vehicle contacts a respective one of the plurality of spokes and the unmanned aerial vehicle is centered relative to the center hub.

BRIEF DESCRIPTION OF THE FIGURES

The foregoing and other objects, features and advantages of the exemplary embodiments will be more fully understood from the following description when read together with the accompanying drawings, in which.

DETAILED DESCRIPTION

Figure 1:
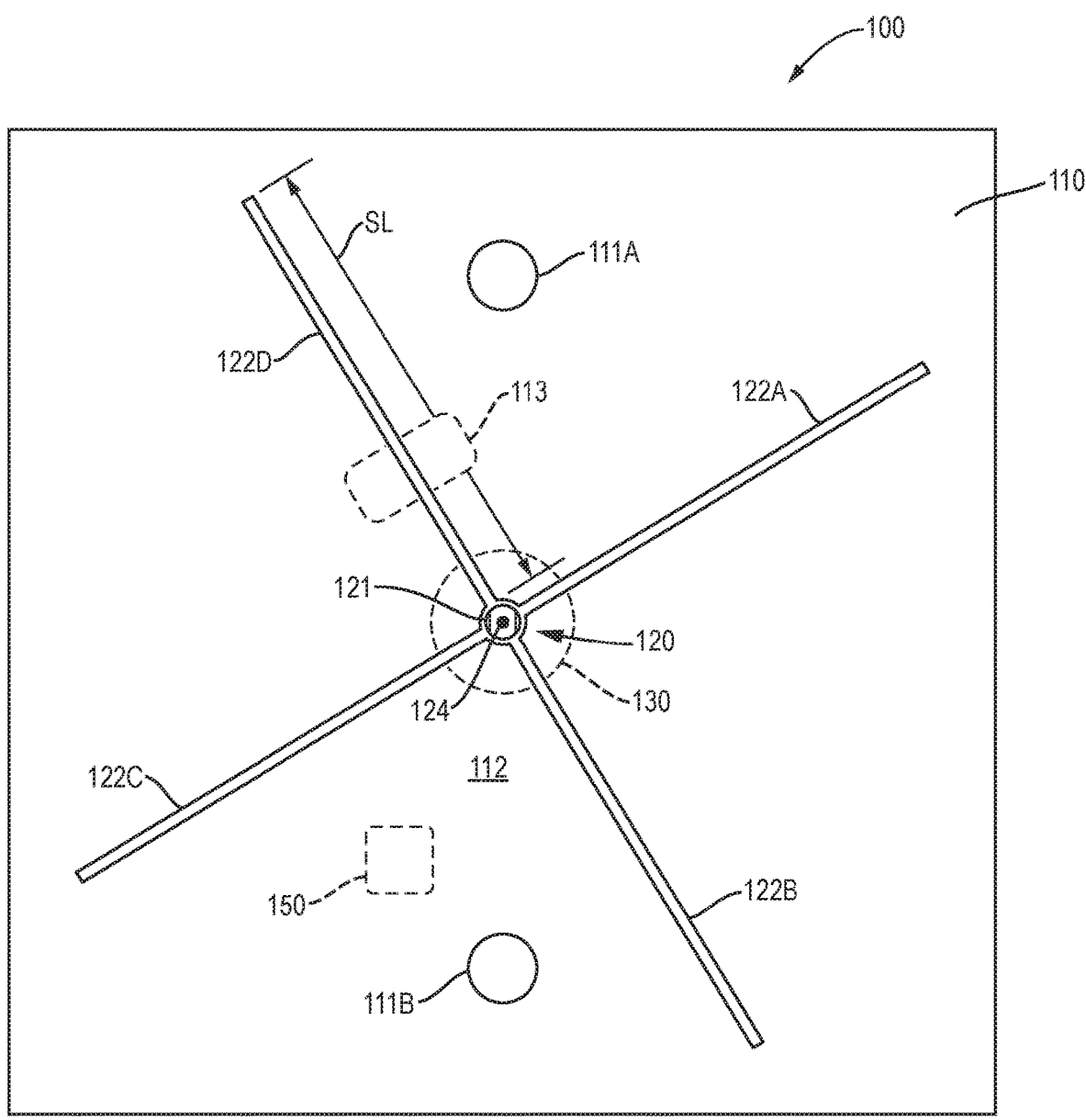
FIG. 1 is a perspective view of an exemplary embodiment of a charging station for an unmanned aerial vehicle.

The present disclosure provides charging stations and landing station systems for unmanned aerial vehicles. In one exemplary embodiment, and referring now to FIG. 1, an exemplary embodiment of a charging station 100, which may also be referred to as a "landing station," is shown that includes a landing surface 110, a centering wheel 120 rotatably associated with the landing surface 110, and a rotator 130 coupled to the centering wheel 120.

The landing surface 110 includes a pair of charging terminals 111A, 111B that are spaced apart from one another, with one of the charging terminals 111A being referred to as a "first charging terminal" and the other of the charging terminals 111B being referred to as a "second charging terminal," for convenience of description. Each of the charging terminals 111A, 111B is formed of an electrically conductive material, such as copper, to provide electric current to an unmanned aerial vehicle, as will be described further herein. While the electrically conductive material is previously described as being copper, the charging terminals 111A, 111B can be formed of other electrically conductive materials including, but not limited to, conductive metals such as silver, gold, aluminum, iron, steel, brass, bronze, and platinum; and non-metal conductors such as graphite and electrically conductive polymers. In some exemplary embodiments, the charging terminals 111A, 111B are formed as pads or discs of the same electrically conductive material that extend above the landing surface 110. In other exemplary embodiments, the charging terminals 111A, 111B can be formed flush with or recessed below the landing surface 110. The charging terminals 111A, 111B may be formed of the same or different electrically conductive materials. The landing surface 110 also includes an electrically insulating material 112 disposed between the charging terminals 111A, 111B so the charging terminals 111A, 111B do not spontaneously form an electrically closed circuit with one another when connected to an electrical power source 113. Another electrically conductive material electrically couples the terminals 111A, 111B together to form an electrically closed circuit, which will be described further herein. The electrically insulating material 112 may, in some exemplary embodiments, be a non-conductive polymer, such as a plastic, and form a bulk of the landing surface 110. Exemplary landing surfaces 110 may be, but are not limited to: a landing pad placed in a predetermined location such as a field or forest; a surface on a vehicle such as a truck, boat, or car; or a surface on a stationary structure such as a building rooftop. The electrical power source 113 may, in some exemplary embodiments, be on a side of the landing surface 110 opposite the centering wheel 120 and include one or more electrically coupled batteries or an AC/DC power converter connected to a source of mains electricity.

The centering wheel 120 is rotatably associated with the landing surface 110 and includes a center hub 121 with a plurality of spokes, shown as four spokes 122A, 122B, 122C, 122D, extending from the center hub 121. While the centering wheel 120 is shown with four spokes, the centering wheel 120 may be formed to only have a pair of spokes, three spokes, or more than four spokes, if desired. The centering wheel 120 may be associated with the landing surface 110 in any way that allows rotation of the centering wheel 120 relative to the landing surface 110; in some exemplary embodiments, the centering wheel 110 may rotate in a plane that is parallel to the landing surface 110.

It can be seen that each of the spokes 122A, 122B, 122C, 122D can define a respective spoke length SL relative to the center hub 121. In some exemplary embodiments, the spoke length SL of each spoke is the same. In some exemplary embodiments, the spoke length of one or more of the spokes can be different. As can be appreciated from FIG. 2, each of the spokes 122A, 122B, 122C, 122D can pass over both of the charging terminals 111A, 111B during a full rotation of the centering wheel 120, which will be described further herein. In some exemplary embodiments, some of the spokes 122A, 122B, 122C, 122D may pass over the charging terminals 111A, 111B during a full rotation of the centering wheel 120. As used herein, a "full rotation" of the centering wheel 120 can be a 360° rotation of the centering wheel 120 about an axis of rotation defined through the center hub 121. The spokes 122A, 122B, 122C, 122D can be equally spaced apart from one another on a circumference defined about the center hub 121, for example, when there are four spokes 122A, 122B 122C, 122D, a 90° arc can be defined between any two adjacent spokes 122A, 122B, 122C, 122D, e.g., between spokes 122A and 122B or between spokes 122A and 122D.

In some exemplary embodiments, the centering wheel 120 includes one or more light emitters 124, such as a light-emitting diode (LED). The light emitter(s) 124 can be a light emitting unit having its own power source or, alternatively, may be electrically coupled to the electrical power source 113. The light emitter(s) 124 can emit light with many possible wavelengths and colors, such as so-called "white" light, blue light, green light, red light, etc.

The rotator 130 is coupled to the centering wheel 120 and is configured to rotate the centering wheel 120 to align an unmanned aerial vehicle with the first charging terminal 111A and the second charging terminal 111B, as will be described further herein. The rotator 130 may be any type of rotary motor directly or indirectly coupled to the centering wheel 120 to allow rotation of the rotator 130 to rotate the centering wheel 120. The rotator 130 may be controlled by a controller 150, which may be located on the same side of the landing surface as the electrical power source 113, to selectively rotate, as will be described further herein.

Figure 2:
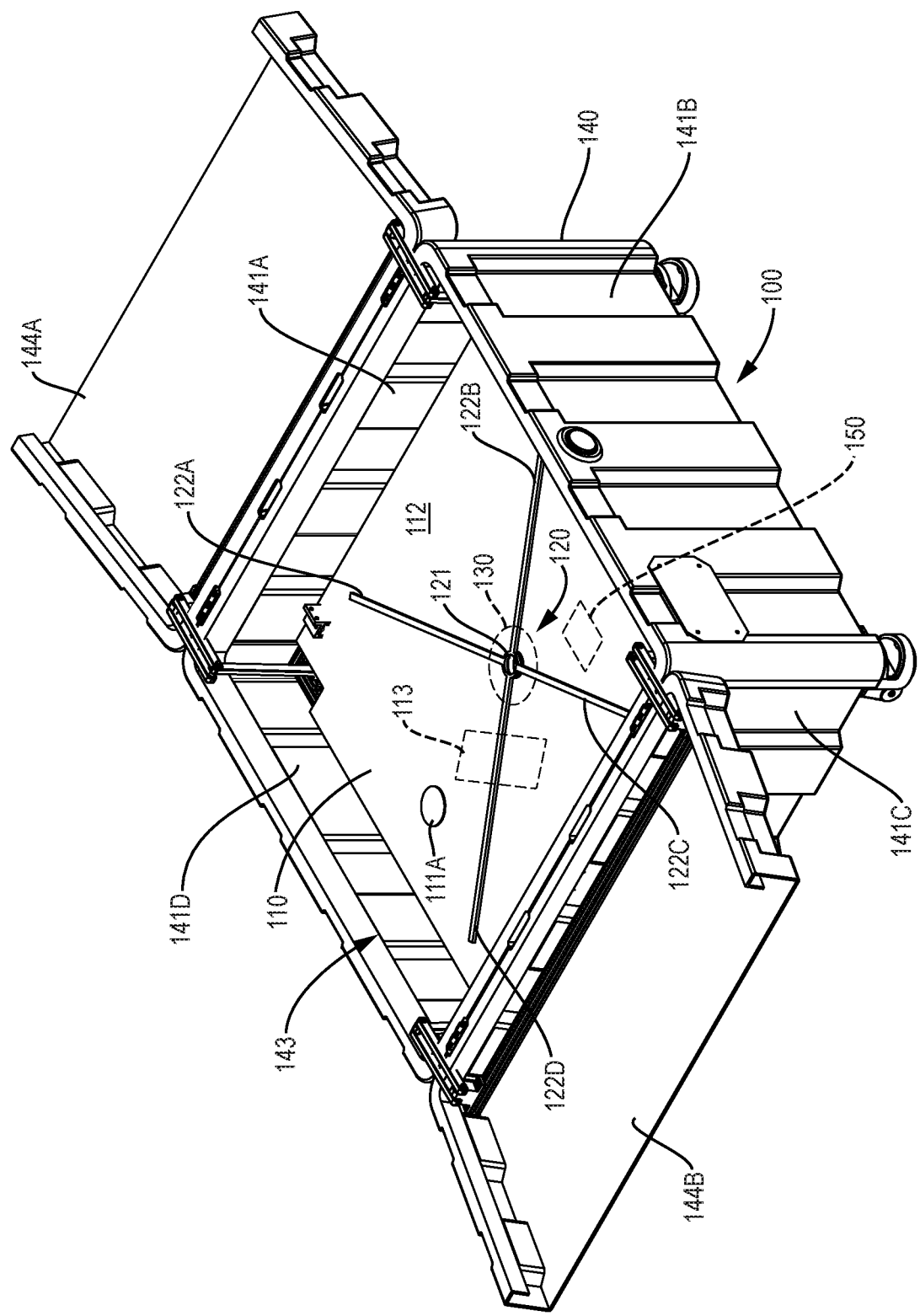
FIG. 2 is a perspective view of the charging station shown in FIG. 1 housed within a portable housing.
Figure 3:
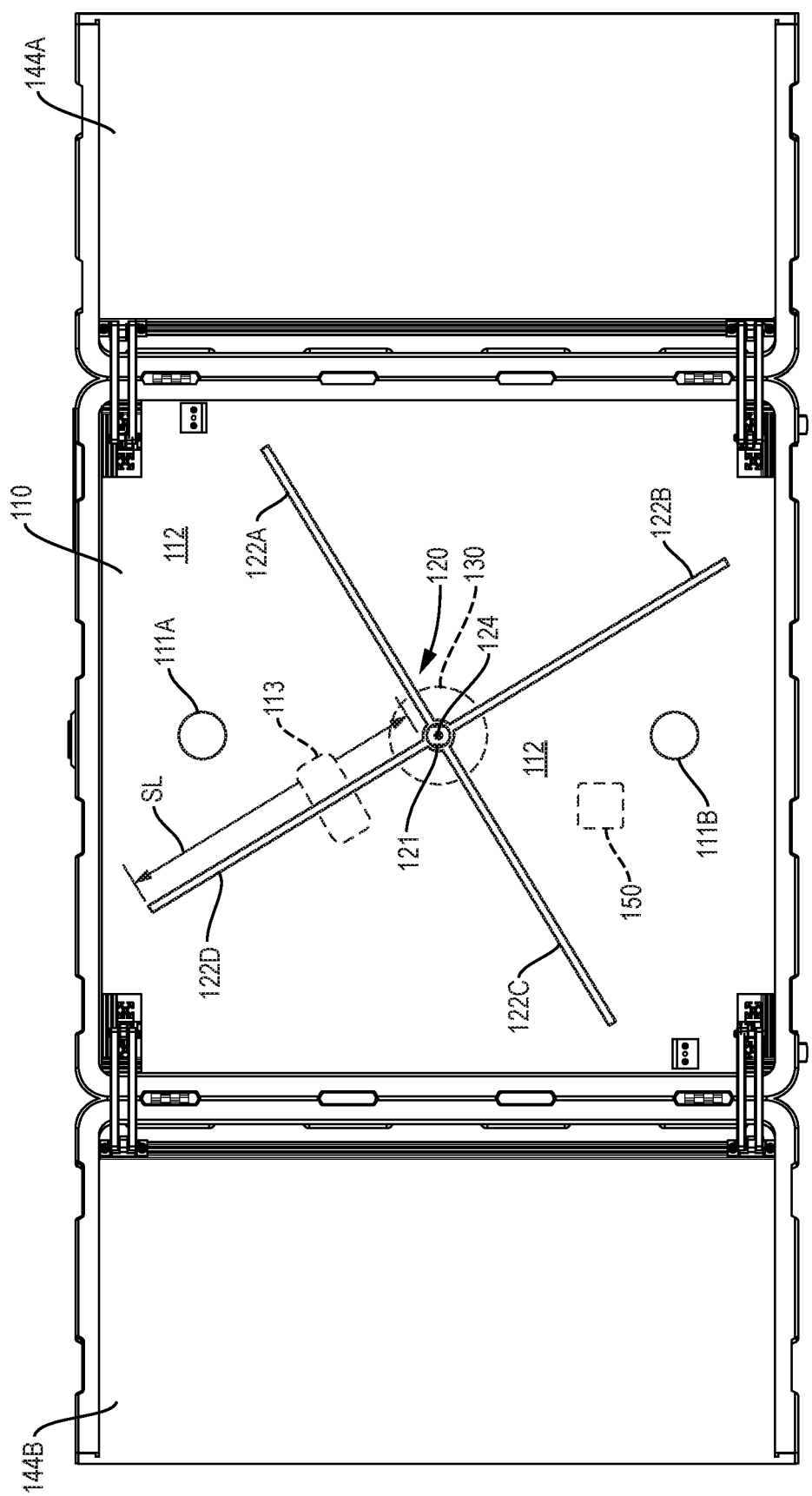
FIG. 3 is a top view of the charging station and housing shown in FIG. 2.

In some exemplary embodiments, and referring now to FIGS. 2-3, the charging station 100 can optionally include an appropriately sized portable housing 140 supporting the landing surface 110 and including connected housing walls 141A, 141B, 141C, 141D, bottom (not shown) under the landing surface 110, and an opening 143 opposing the landing surface 110. The housing 140 can also have one or more covers 144A, 144B, which are shown as being hinged to respective housing walls 141A, 141C, that can selectively cover and uncover the opening 143 so the housing 140 is a closable box structure. In some embodiments, the electrical power source 113, rotator 130, and/or controller 150 may be partially or fully enclosed by the housing 140 and landing surface 110 to limit access to the electrical components of the charging station 100.

Figure 4:
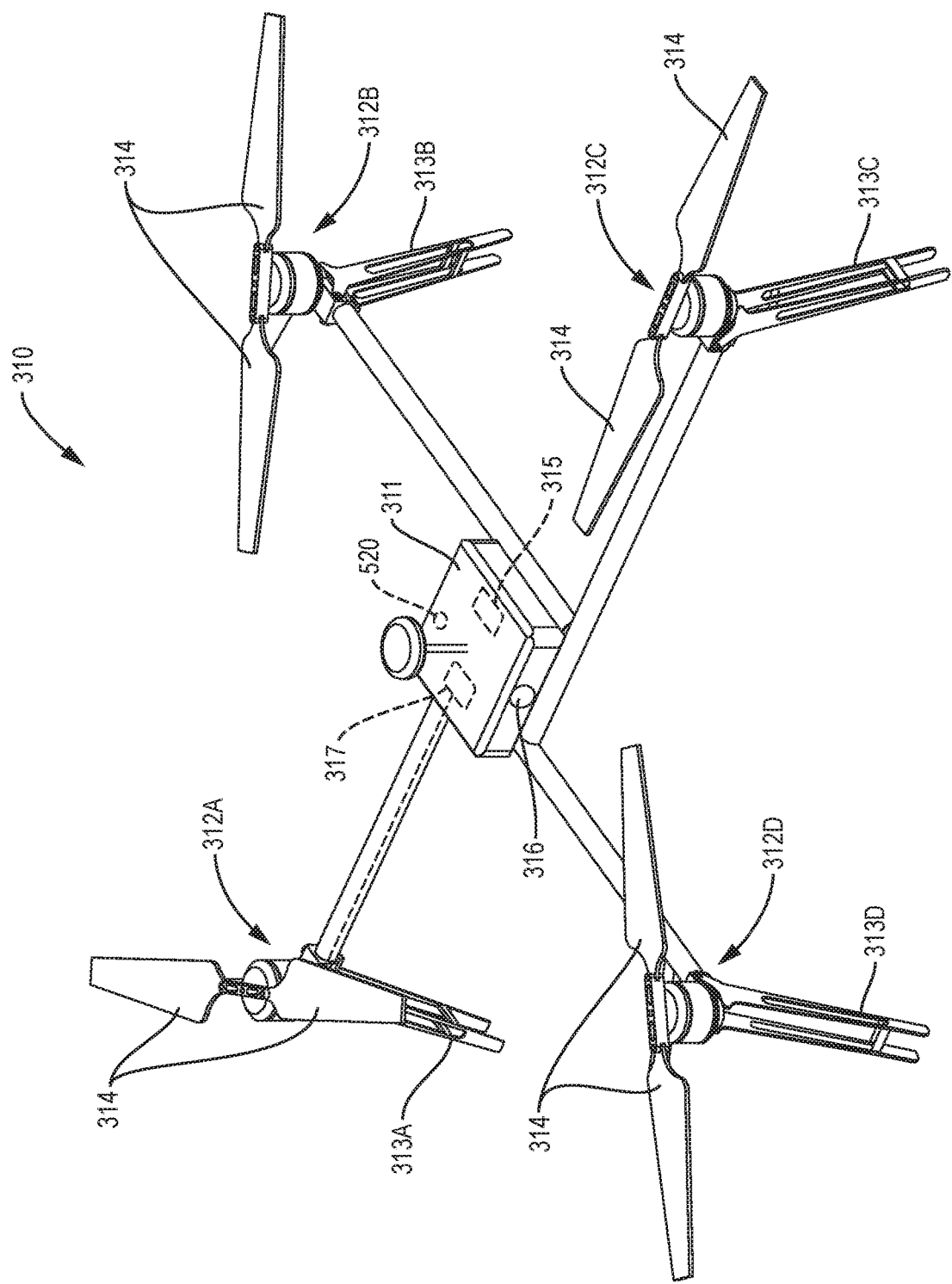
FIG. 4 is a perspective view of an exemplary embodiment of an unmanned aerial vehicle.

Referring now to FIG. 4, an exemplary embodiment of an unmanned aerial vehicle (UAV) 310 is shown. As used herein, the aerial vehicle 310 is an "unmanned aerial vehicle" in the sense that the aerial vehicle 310 may be sized and controlled to fly through the air without carrying an operator, such as a pilot. The UAV 310 includes a vehicle body 311 that carries at least one lift generator, shown as four lift generators 312A, 312B, 312C, 312D, and a plurality of landing legs, shown as four landing legs 313A, 313B, 313C, 313D. In some exemplary embodiments, each of the lift generators 312A, 312B, 312C, 312D can be associated with a respective landing leg 313A, 313B, 313C, 313D. As used herein, a "lift generator" is any type of construction that can produce lift to allow the UAV 310 to travel above the ground; in some exemplary embodiments, the lift generator(s) 312A, 312B, 312C, 312D include one or more rotatable propellers 314 that rotate to produce lift. The UAV 310 can also include a vehicle controller 315 carried by the vehicle body 311 and an image capture device 316, such as a camera, operatively coupled to the vehicle controller 315 to transmit captured images to the vehicle controller 315, as will be described further herein.

The components of the UAV 310 can be powered by a rechargeable vehicle power source 317, such as one or more rechargeable batteries, that is electrically coupled to the components of the UAV 310. The rechargeable vehicle power source 317 may, in some exemplary embodiments, include one or more lithium-ion batteries that can be recharged when a charging electric current flows through the rechargeable vehicle power source 317.

Figure 5:
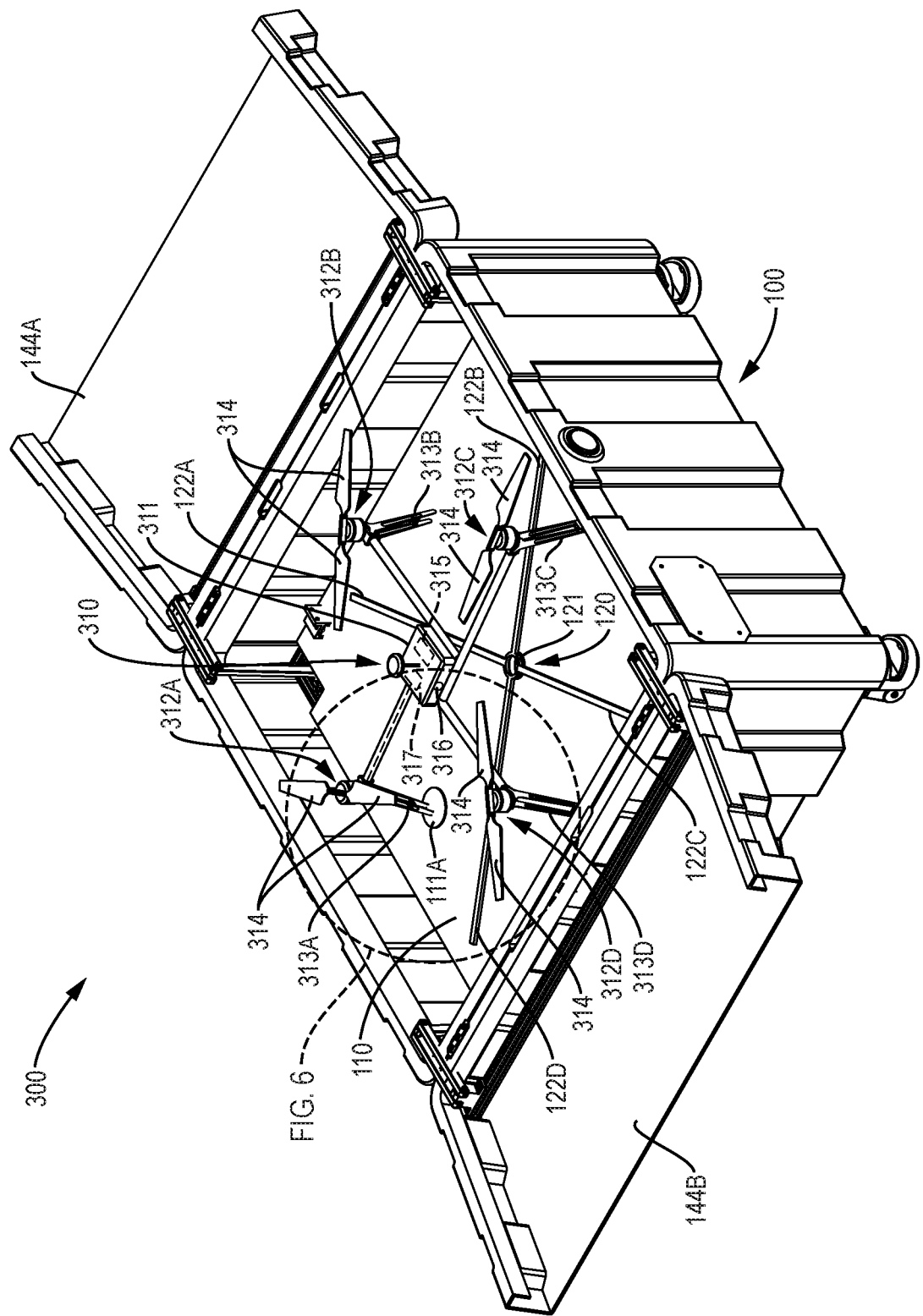
FIG. 5 is a perspective view of an exemplary embodiment of an unmanned aerial vehicle landing system with the unmanned aerial vehicle shown in FIG. 4 placed on a landing station.
Figure 6:
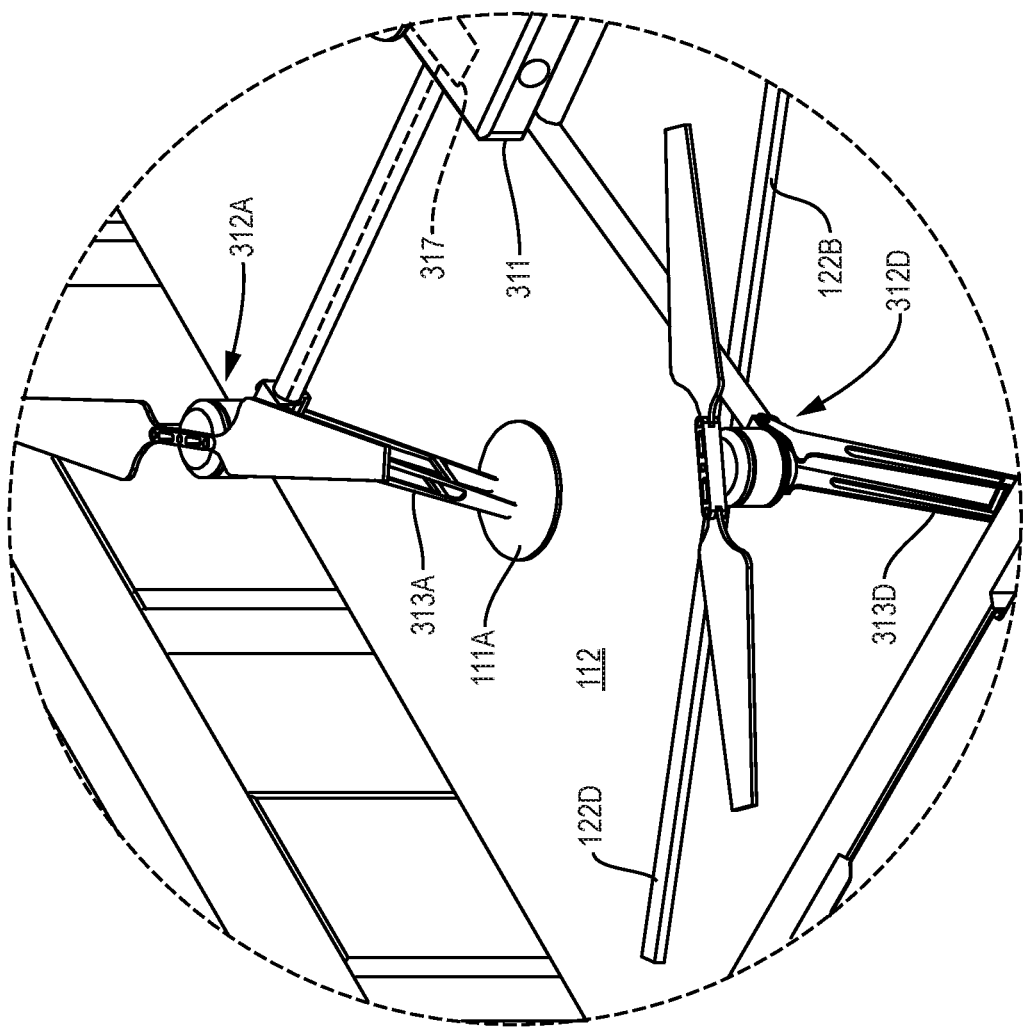
FIG. 6 is a close-up perspective view of a conductive leg of the unmanned aerial vehicle shown in FIGS. 4-5 placed on a charging terminal of the landing station.
Figure 7:
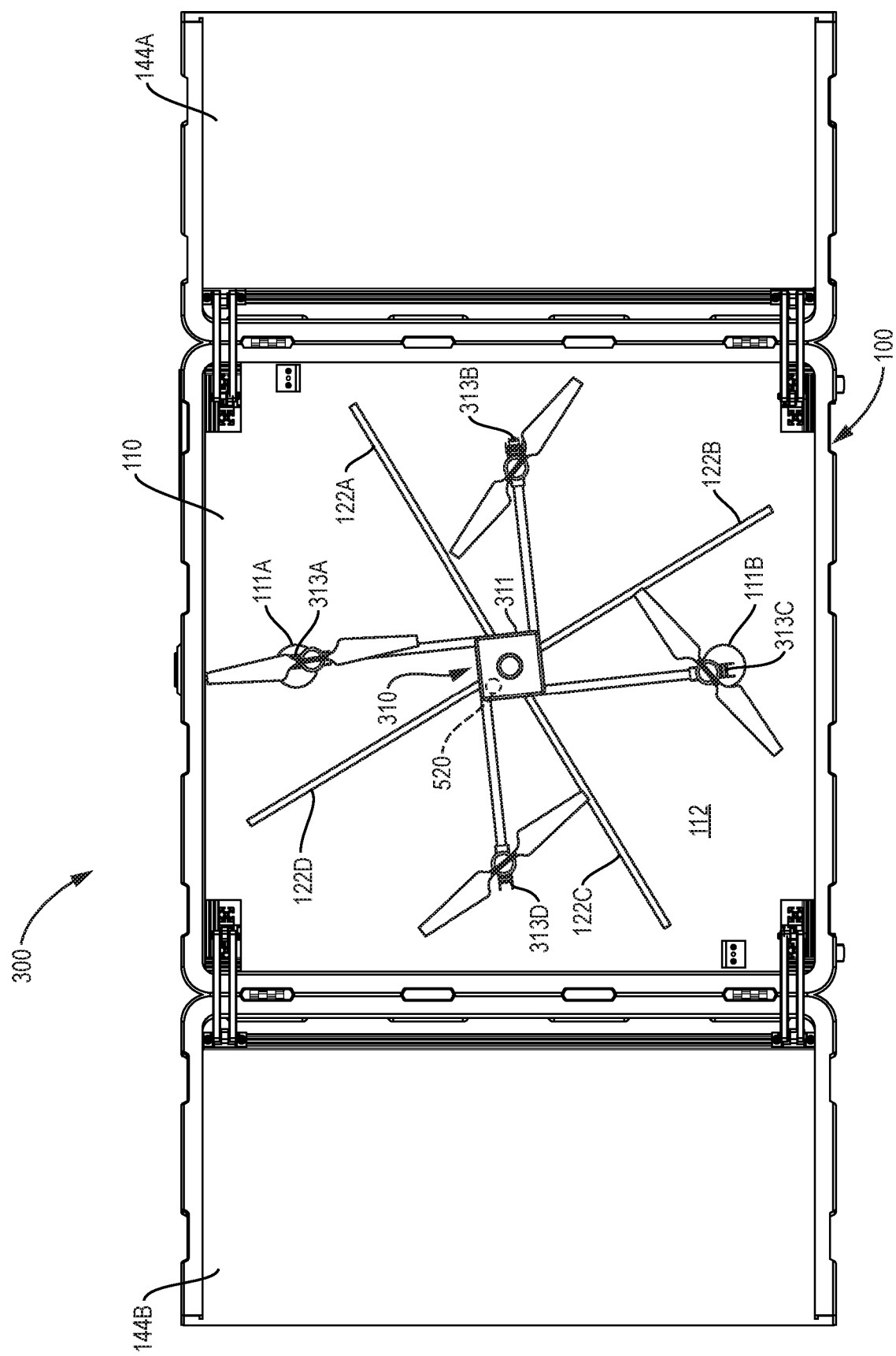
FIG. 7 is a top view of the unmanned aerial vehicle landing system shown in FIGS. 5-6.

Referring now also to FIGS. 5-7, an exemplary embodiment of an unmanned aerial vehicle landing system 300 is illustrated that includes the UAV 310 placed on the landing station 100. To recharge the rechargeable vehicle power source 317, the landing legs 313A, 313B, 313C, 313D can include a first conductive leg 313A and a second conductive leg 313C having an electrically conductive material and are electrically coupled to the rechargeable vehicle power source 317 by, for example, an electrically conductive wire embedded or affixed to each conductive leg 313A, 313D. FIG. 6 is a close-up view of one of the landing legs 313A contacting one of the charging terminals 111A. When one of the conductive legs, for example 313A, contacts a positive charging terminal, such as the first charging terminal 111A, and the other of the conductive legs, for example 313C, contacts a negative charging terminal, such as the second charging terminal 111B, an electrical charging of the rechargeable vehicle power source 317 from the electrical power source 113 of the landing station 100 can take place. The landing station 100, therefore, can charge the UAV 310 without a user needing to manually plug in and/or replace the vehicle power source 317.

In some exemplary embodiments, the controller 150 of the landing station 100 includes or controls a switch that controls the flow of electricity from the electrical power source 113 through the charging terminals 111A, 111B. The controller 150 can be configured to normally keep the switch in an "off" position so electricity cannot flow through the charging terminals 111A, 111B, even when the terminals 111A, 111B are conductively coupled to one another. Once the controller 150 receives a charging signal, the controller 150 changes the switch to an "on" position so electricity can flow through the charging terminals 111A, 111B from the electrical power source 113 and, for example, charge the UAV 310. The charging signal can be transmitted to the controller 150, for example, remotely by an operator or, in some embodiments, from the UAV 310. In other exemplary embodiments, the charging signal is from a weight sensor (not shown) or other type of sensor that detects the UAV 310 is on the landing surface 110. In some exemplary embodiments, the controller 150 is configured to only change the switch to the on position when the controller 150 detects the UAV 310 is properly oriented to recharge the vehicle power source 317. In some exemplary embodiments, the controller 150 is configured to return the switch to the off position after receiving a charge terminating signal, which may be sent to the controller 150 from the operator or UAV 310. In other exemplary embodiments, the controller 150 is configured to return the switch to the off position after the sensor(s) no longer detects the UAV 310 is on the landing surface 110 or after a predetermined charge time period has elapsed following changing the switch to the on position.

Referring now to FIGS. 8-13, it can be seen how the centering wheel 120 can rotate the UAV 310 to align it with the center hub 121 on the landing surface 110. In some exemplary embodiments, aligning the UAV 310 with the center hub 121 contacts the conductive legs 313A, 313C with the charging terminals 111A, 111B to recharge the vehicle power source 317.

Figure 8:
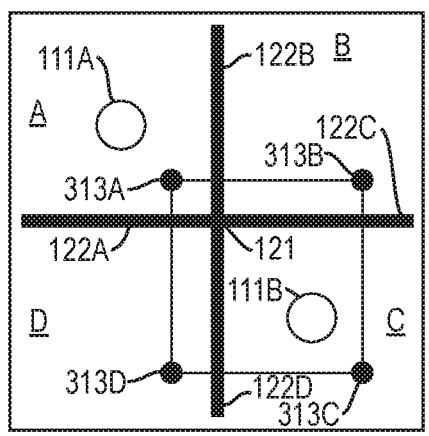
FIG. 8 is a top view illustrating an unmanned aerial vehicle placed on the landing station shown in FIGS. 5-6 before centering.

Referring specifically to FIG. 8, the UAV 310 is on the landing surface 110 such that each of the landing legs 313A, 313B, 3130, 313D are in a respective landing quadrant A, B, C, D each defined between two of the spokes 122A, 122B, 122C, 122D, with a center of the UAV 310 offset from the center hub 121 of the centering wheel 120. After the UAV 310 is on the landing surface 110, the rotator 130 can be activated to rotate the centering wheel 120. In some exemplary embodiments, the controller 150 operatively coupled to the rotator 130 can activate the rotator 130 responsively to receiving a start signal from a user, or otherwise, to begin centering the UAV 310. In some exemplary embodiments, the controller 150 can receive the start signal from the vehicle controller 315 via a transceiver or other communication element. In some exemplary embodiments, the start signal can be transmitted to the controller 150 utilizing BLUETOOTH a wireless fidelity (Wi-Fi), or other types of wireless communication standards.

Figure 9:
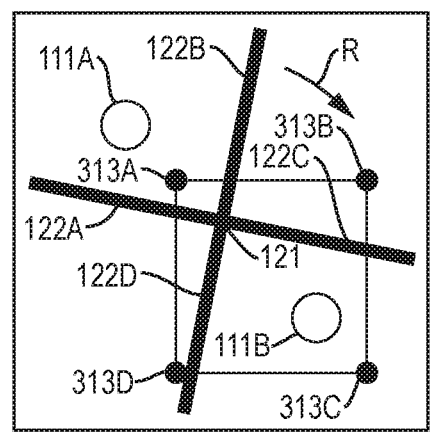
FIG. 9 is a top view illustrating the landing station and unmanned aerial vehicle shown in FIG. 8 after rotation of a centering wheel of the landing station.
Figure 10:
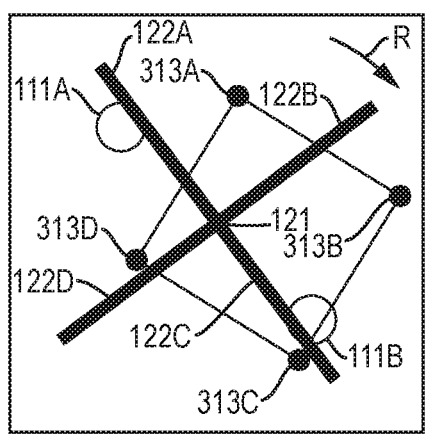
FIG. 10 is a top view illustrating the landing station and unmanned aerial vehicle shown in FIG. 9 after further rotation of the centering wheel.
Figure 11:
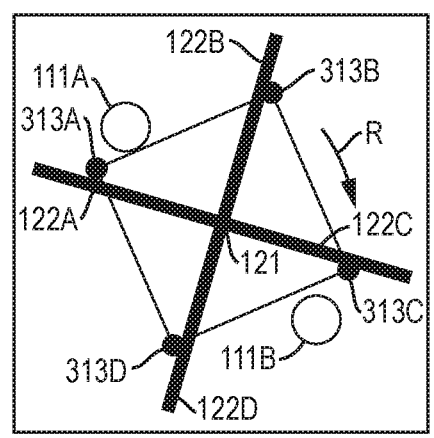
FIG. 11 is a top view illustrating the landing station and unmanned aerial vehicle shown in FIG. 10 after further rotation of the centering wheel so the unmanned aerial vehicle is centered.

Once the rotator 130 starts rotating the centering wheel 120, shown as rotating clockwise in a rotation direction R in FIG. 9, one of the spokes 122D can contact a respective one of the landing legs 313D of the UAV 310. Once the spoke 122D contacts the landing leg 313D, the landing leg 313D is moved by the spoke 122D and acts as a pivot for the rest of the UAV 310. As shown in FIG. 10, further rotation of the centering wheel 120 in the rotation direction R causes contact of another of the landing legs 3130 with one of the spokes 122C so the landing legs 313C, 313D are both moved by a respectively contacting spoke 122C, 122D to pivot the UAV 310. The centering wheel 120 continues to rotate in the rotation direction R until all of the landing legs 313A, 313B, 313C, 313D contact a respective spoke 122A, 122B, 122C, 122D of the centering wheel 120, as shown in FIG. 11, centering the UAV 310 relative to the center hub 121.

Figure 12:
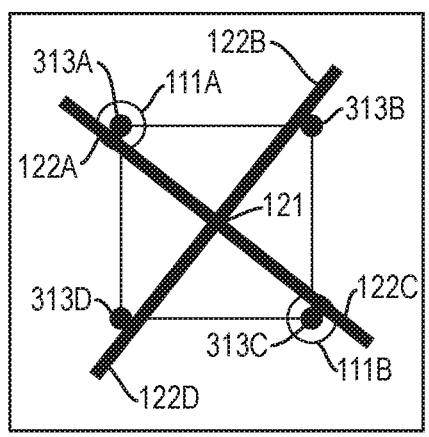
FIG. 12 a top view illustrating the landing station and unmanned aerial vehicle shown in FIG. 11 after further rotation of the centering wheel so the unmanned aerial vehicle is centered and oriented on the landing station to charge.
Figure 13:
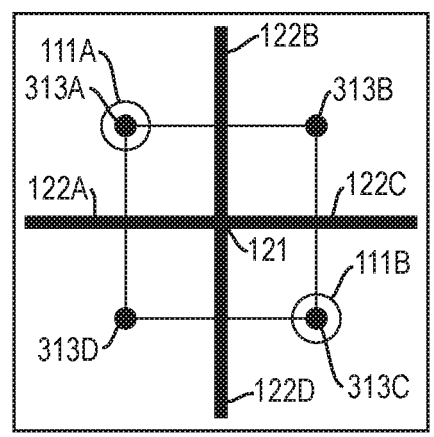
FIG. 13 is a top view illustrating the landing station and unmanned aerial vehicle shown in FIG. 12 after counter-rotation of the centering wheel so the unmanned aerial vehicle is centered and oriented on the landing station to charge without contacting any spokes of the centering wheel.

From FIGS. 8-11, it should be appreciated that the UAV 310 can be centered relative to the center hub 121 within a full 360 rotation of the centering wheel 120 about the center hub 121 defining the axis of rotation of the centering wheel 120. After a full rotation of the centering wheel 120, the controller 150 can cause the rotator 130 to rotate the centering wheel 120 an additional amount so the spokes 122A, 122B, 122C, 122D rotate to a predefined orientation that ensures the conductive legs 313A, 313C of the centered UAV 310 contact the respective charging terminals 111A, 111B, as shown in FIG. 12. After rotating the centering wheel 120 to the predefined orientation shown in FIG. 12, the controller 150 can control the rotator 130 to counter-rotate so the spokes 122A, 122B, 122C, 122D no longer contact the landings legs 313A, 313B, 313C, 313D, as shown in FIG. 13, so the spokes 122A, 122B, 122C, 122D do not interfere with take-off of the UAV 310 from the landing station 300. During or after the centering, the controller 150 can also activate hinges connected to the cover(s) 144A, 144B to cover and protect the centered UAV 310 as the conductive legs 313A, 313C contact the charging terminals 111A, 111B to recharge the vehicle power source 317. In some exemplary embodiments, the spokes 122A, 122B, 122C, 122D start in a predefined orientation that ensures the conductive legs 313A, 313C contact the charging terminals 111A, 111B after a full rotation of the centering wheel 120.

From the foregoing, it should be appreciated that the landing station 100 can be configured to center unmanned aerial vehicles after landing thereon or being placed thereon. In some exemplary embodiments, the centering wheel 120 of the landing station 100 defines a number of spokes 122A, 122B, 122C, 122D, such as four, and the unmanned UAV 310 defines a number of landing legs 313A, 313B, 313C, 313D, also four, equal to the number of spokes so that each landing leg 313A, 313B, 313C, 313D contacts a respective spoke 122A, 122B, 122C, 122D of the centering wheel 120 after a full rotation of the centering wheel 120 centers the UAV 310 relative to the center hub 121.

Figure 15:
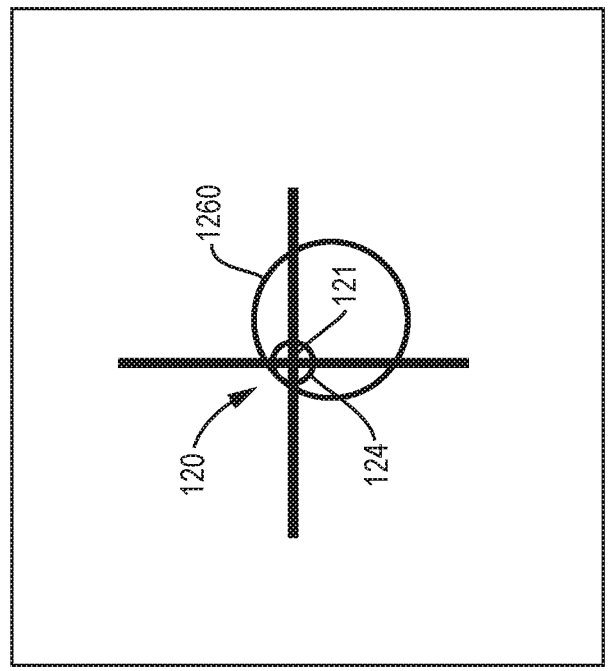
FIG. 15 is an illustration of another image captured by the image capture device during the landing protocol of the unmanned aerial vehicle.
Figure 14:
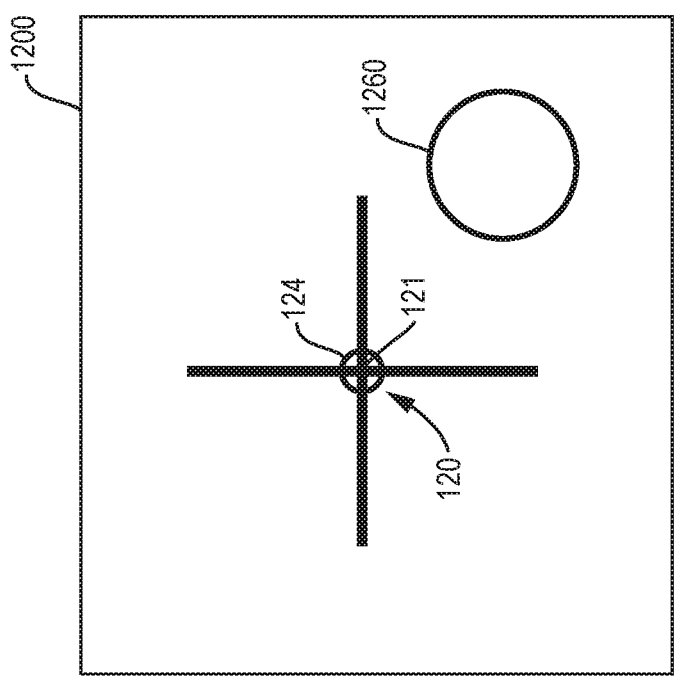
FIG. 14 is an illustration of an image captured by an exemplary embodiment of an image capture device during a landing protocol of the unmanned aerial vehicle.
Figure 16:
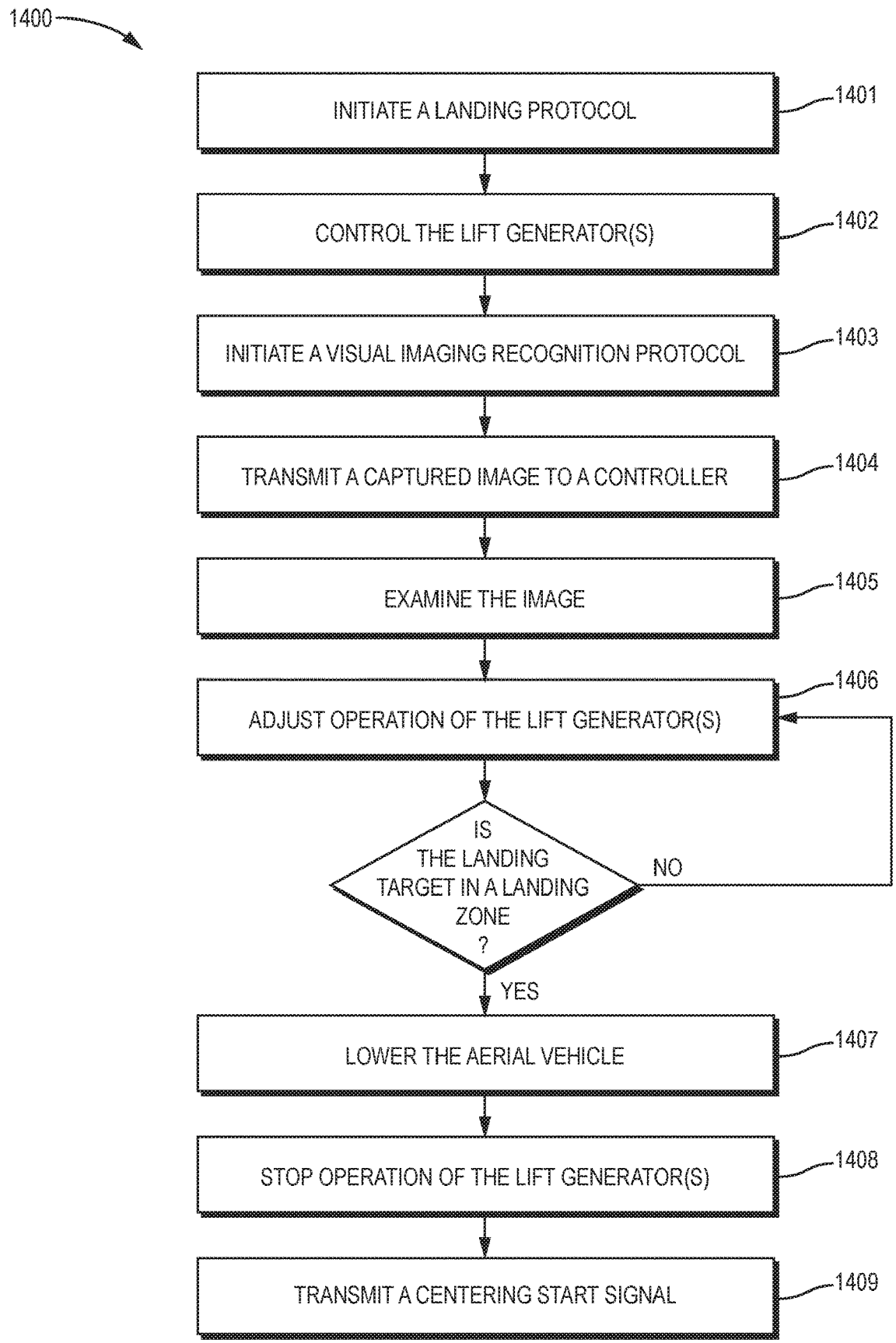
FIG. 16 is a flow chart illustrating an exemplary embodiment of a method for placing an unmanned aerial vehicle on a landing surface.

Referring now to FIG. 16, an exemplary embodiment of a method 1400 for landing a UAV 310 on a landing surface 110 is shown. In some exemplary embodiments, the vehicle controller 315 can initiate a landing protocol 1401, which can include controlling 1402 the lift generator(s) 312A, 312B, 312C, 312D to place the UAV 310 within approximately 1-10 feet of the landing station 110 by utilizing global positioning satellite (GPS) locating. Within 1-10 feet of the landing station 110, the vehicle controller 315 can initiate a visual imaging recognition protocol 1403 to land the UAV 310 on the landing surface 110. The visual imaging recognition protocol can include transmitting one or more captured images 1404 from the image capture device 316 to the vehicle controller 315. The vehicle controller 315 is configured to examine the image(s) 1405 and determine if a landing target is in at least one of the captured images and adjust 1406 at least one of the lift generator(s) 312A, 312B, 312C, 312D based on a location of the recognized landing target in the at least one captured image. An exemplary captured image 1200 is shown in FIG. 14. It should be appreciated that the captured image(s) 1200 can be transmitted 1404 to the vehicle controller 315 in real-time or as discrete captured images. In some exemplary embodiments, the landing target is the one or more light emitters 124 on the center hub 121. The vehicle controller 315 can be configured to keep adjusting 1406 the lift generator(s) 312A, 312B, 312C, 312D until the landing target (light emitter 124) is located within a target zone 1260 (shown in FIGS. 14-15) defined within the captured image(s). Once the landing target 124 is located within the target zone 1260, as shown in FIG. 15, the vehicle controller 315 can adjust operation of the lift generator(s) 312A, 312B, 312C, 312D to lower 1407 the UAV 310 onto the landing surface 110. Once the UAV 310 is landed, the centering wheel 120 rotates to center the UAV 310 relative to the center hub 121. In some exemplary embodiments, the UAV 310 also has a compass 520 (shown in FIG. 4) or other orientation device to ensure that the UAV 310 is always facing a certain direction, such as north, when the vehicle controller 315 initiates 1401 the landing protocol so the conductive legs 313A, 313C contact the charging terminals 111A, 111B after a full rotation of the centering wheel 120. Once the UAV 310 contacts the landing surface 110, the vehicle controller 315, in some exemplary embodiments, can stop 1408 operation of the lift generator(s) 312A, 312B, 312C, 312D and transmit a centering start signal 1409 to the controller 150 of the landing station 100 to initiate centering of the UAV 310 on the landing surface 110.

Figure 17:
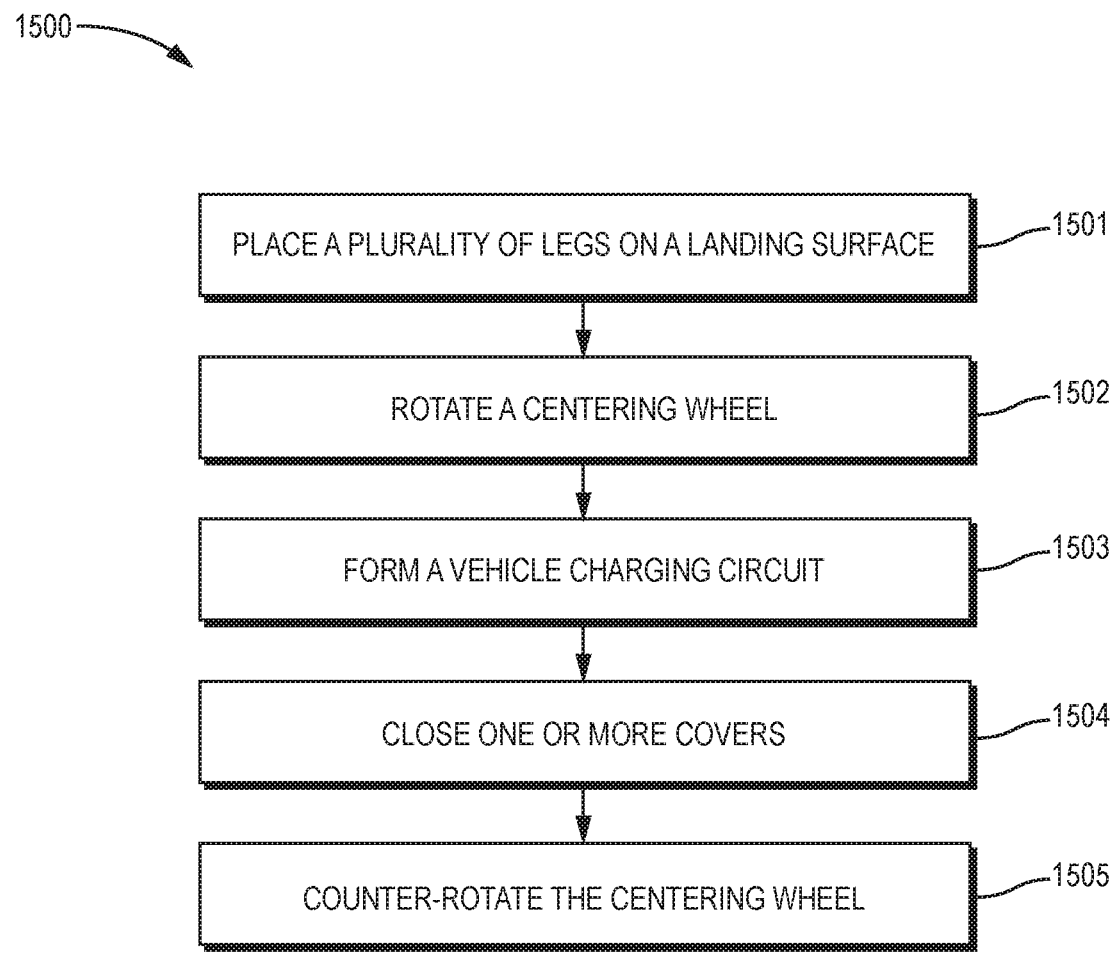
FIG. 17 is a flow chart illustrating an exemplary embodiment of a method of centering an unmanned aerial vehicle.

Referring now to FIG. 17, an exemplary embodiment of a method 1500 of centering a UAV 310 on a landing surface 110 is shown. The method 1500 includes placing 1501 a plurality of legs 313A, 313B, 313C, 313D of the UAV 310 on the landing surface 110. In some exemplary embodiments, the legs 313A, 313B, 313C, 313D can be placed 1501 on the landing surface 110 using the previously described method 1400. The method 1500 further includes rotating 1502 the centering wheel 120 a full rotation so that each of the legs 313A, 313B, 313C, 313D of the UAV 310 contacts a respective spoke 122A, 122B, 122C, 122D of the centering wheel 120 and the UAV 310 is centered relative to a center hub 121 of the centering wheel 120. The method 1500 can further include forming 1503 a vehicle charging circuit to recharge a rechargeable vehicle power source 317 of the UAV 310 with an electrical power source 113 of the landing station 100. Forming the vehicle charging circuit 1503 can include rotating the centering wheel 120 to electrically couple a first conductive leg 313A of the UAV 310 to a first charging terminal 111A of the landing surface 110 and a second conductive leg 313C of the UAV 310 to a second charging terminal 111B of the landing surface 110. In some exemplary embodiments, the method 1500 also includes closing 1504 one or more covers 144A, 144B to cover an opening 143 of a housing 140 of the landing station 100 and protect the UAV 310. The method 1500 can also include counter-rotating 1505 the centering wheel 120 so the spokes 122A, 122B, 122C, 122D of the centering wheel 120 no longer contact the legs 313A, 313B, 313C, 313D of the centered UAV 310.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step to may be replaced with a plurality of elements or steps that serve the same purpose. Further, where parameters for various properties are specified herein for exemplary embodiments, those parameters may be adjusted up or down by $\frac{1}{20}$th, $\frac{1}{10}^{th}$, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

What is claimed is:

1. A landing station for an unmanned aerial vehicle having at least one landing leg, the landing station comprising:
   a landing surface;
   a centering wheel coupled to the center of the landing surface and having at least one spoke extending therefrom, the at least one spoke positioned to rotate relative to the landing surface in response to rotation of the centering wheel relative to the landing surface, the at least one spoke configured to rotate into engagement with the at least one landing leg of the unmanned aerial vehicle to impart centrifugal force onto the at least one landing leg sufficient to rotate the unmanned aerial vehicle toward a predetermined position on the landing surface.

2. The landing station of claim 1, wherein the centering wheel includes a center hub from which the at least one spoke extends.

3. The landing station of claim 2, wherein the at least one spoke includes a plurality of spokes positioned in spaced relation about the center hub.

4. The landing station of claim 3, wherein the at least one spoke is spaced from the landing surface.

5. The landing station of claim 4, wherein the at least one spoke includes an elongated shaft.

6. The landing station of claim 3, further comprising at least one light emitter on the center hub.

7. The landing station of claim 6, wherein the at least one light emitter comprises a light-emitting diode.

8. The landing station of claim 1, further comprising a housing supporting the landing surface and having a plurality of connected walls and an opening opposing the landing surface.

9. The landing station of claim 8, further comprising at least one cover configured to selectively cover and uncover the opening.

10. The landing station of claim 1, further comprising a rotator coupled to the centering wheel and configured to rotate the centering wheel.

11. The landing station of claim 1, wherein the predetermined position is centered on the landing surface.

12. An unmanned aerial vehicle landing system, comprising:
    an unmanned aerial vehicle having at least one landing leg; and
    a landing station including a landing surface and a centering wheel coupled to the center of the landing surface, the centering wheel having at least one spoke extending therefrom, the at least one spoke positioned to rotate relative to the landing surface in response to rotation of the centering wheel relative to the landing surface, the at least one spoke configured to rotate into engagement with the at least one landing leg of the unmanned aerial vehicle to impart centrifugal force onto the at least one landing leg sufficient to rotate the unmanned aerial vehicle toward a predetermined position on the landing surface.

13. The unmanned aerial vehicle landing system of claim 12, wherein the unmanned aerial vehicle includes a vehicle body from which the at least one landing leg extends, and at least one lift generator carried by the vehicle body.

14. The unmanned aerial vehicle landing system of claim 13, wherein the unmanned aerial vehicle includes a controller carried by the vehicle body and an image capture device operatively coupled to the controller to transmit captured images to the controller, the controller configured to examine the captured images, determine if a landing target in at least one of the captured images is in a landing zone, and adjust operation of the at least one lift generator based on a location of the recognized landing target in the at least one captured image.

15. The unmanned aerial vehicle landing system of claim 14, wherein the landing station includes at least one light emitter on the centering wheel and the controller of the unmanned aerial vehicle is configured to recognize the at least one light emitter as the landing target.

16. The unmanned aerial vehicle landing system of claim 12, wherein the landing surface includes a first charging terminal formed of a first electrically conductive material and a second charging terminal formed of a second electrically conductive material.

17. The unmanned aerial vehicle landing system of claim 16, wherein the unmanned aerial vehicle includes a rechargeable vehicle power source coupled to the at least one lift generator, the at least one landing leg electrically coupled to the power source and including a first conductive leg configured to contact the first charging terminal and a second conductive leg configured to contact the second charging terminal when the first conductive leg contacts the first charging terminal.

18. The unmanned aerial vehicle landing system of claim 12, wherein the at least one spoke includes a plurality of spokes positioned in spaced relation about the centering wheel.

19. The unmanned aerial vehicle landing system of claim 18, wherein at least one leg includes a plurality of legs, and wherein the plurality of spokes is positioned to engage the plurality of legs of the unmanned aerial vehicle and rotate the plurality of legs so that the centrifugal force urges a first leg of the plurality of legs to a first predetermined position on the landing surface and a second leg of the plurality of legs to a second predetermined position on the landing surface.

20. The unmanned aerial vehicle landing system of claim 19, wherein the unmanned aerial vehicle is centered on the landing surface when the first leg is disposed at the first predetermined position on the landing surface and the second leg is disposed at the second predetermined position on the landing surface.

* * * * *